United States Patent
Ahmed et al.

(10) Patent No.: US 11,998,892 B1
(45) Date of Patent: Jun. 4, 2024

(54) METHOD OF PREPARING A CAPILLARY COLUMN INCLUDING IN SITU FORMATION OF A METAL-ORGANIC FRAMEWORK STATIONARY PHASE

(71) Applicant: KING SAUD UNIVERSITY, Riyadh (SA)

(72) Inventors: Ahmed Yacine Badjah Hadj Ahmed, Riyadh (SA); Khadejah Dhafer Yahya Otaif, Riyadh (SA); Zeid Abdullah Alothman, Riyadh (SA); Khalid Mohammed Nasser Alotaibi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/133,636

(22) Filed: Apr. 12, 2023

(51) Int. Cl.
  *B01J 20/282*  (2006.01)
  *B01J 20/286*  (2006.01)
  *G01N 30/60*  (2006.01)
  *G01N 30/02*  (2006.01)

(52) U.S. Cl.
  CPC .......... *B01J 20/282* (2013.01); *B01J 20/286* (2013.01); *G01N 30/6078* (2013.01); *G01N 2030/025* (2013.01)

(58) Field of Classification Search
  None
  See application file for complete search history.

(56) References Cited

U.S. PATENT DOCUMENTS

2016/0208047 A1  7/2016  Huang et al.

FOREIGN PATENT DOCUMENTS

| CN | 101706481 A | | 5/2010 | |
|---|---|---|---|---|
| CN | 102091604 A | | 6/2011 | |
| CN | 102631796 A | | 8/2012 | |
| CN | 103623795 A | | 3/2014 | |
| CN | 104722099 A | | 6/2015 | |
| CN | 106492651 A | * | 3/2017 | ........... B01D 61/362 |
| CN | 107174838 A | | 9/2017 | |
| DE | 102011002540 A1 | | 7/2012 | |

OTHER PUBLICATIONS

Machine translation of DE 102011002540 published Jul. 12, 2012.*
Gu et al., "Fabrication of isoreticular metal-organic framework coated capillary columns for high-resolution gas chromatographic separation of persistent organic pollutants," Anal. Chem., May 23, 2011; 83(13):5093-5100.
Read et al., "Metal-Organic Framework Stationary Phases for One- and Two-Dimensional Micro-Gas Chromatographic Separations of Light Alkanes and Polar Toxic Industrial Chemicals," Journal of Chromatographic Science, vol. 58, Issue 5, May/Jun. 2020, pp. 389-400.

* cited by examiner

*Primary Examiner* — Daniel S Larkin
(74) *Attorney, Agent, or Firm* — Nath, Goldberg & Meyer; Richard C. Litman

(57) ABSTRACT

A method of forming a stationary phase of a capillary column for gas chromatography includes in situ growth of a metal-organic framework on an inner surface of the capillary column. The capillary column may include fused silica on an inner surface thereof and can be treated to provide functional groups capable of forming covalent bonds with a difunctional organic linker of the metal-organic framework. Epitaxial growth of the metal organic framework can occur directly on the inner surface of the capillary tube to a desired uniform thickness, controllable by concentration of metal organic framework precursors.

14 Claims, 4 Drawing Sheets

METHOD OF PREPARING A CAPILLARY COLUMN INCLUDING IN SITU FORMATION OF A METAL-ORGANIC FRAMEWORK STATIONARY PHASE

BACKGROUND

1. Field

The disclosure of the present patent application relates to metal organic frameworks and gas chromatography, and particularly, to a method of fabricating capillary columns by in-situ preparation of a MOF porous layer in the capillary column.

2. Description of the Related Art

Metal organic frameworks (MOFs) are hybrid materials belonging to a class of materials called coordination polymers. MOFs comprise organic ligands coordinating inorganic moieties, such as metal ions or clusters. MOFs may feature a crystalline porous structure arising from metallic cations linked together by means of multifunctional organic ligands to form a rigid and highly ordered three-dimensional crystalline structure. The specific crystalline structure is based on the chemical bond between a metal ion as electron acceptor and one or more oxygen or nitrogen atoms from the organic ligand as electron donor. There is a wide choice of metal ions and di-functional or tri-functional organic linkers, such that numerous MOFs may be prepared with tailored morphology, porosity and stability. MOFs have been widely used in various fields, including catalysis, sensing, separation and adsorption, and notably for hydrogen storage.

MOFs feature a fine and well-defined porosity due to pores having walls with monoatomic layer thickness. This uniform porosity in terms of size and shape results in highly selective cavity adsorption. In addition, the specific surface area of MOFs can exceed several thousands $m^2/g$. MOF-based materials are good candidates for application as separation media in chromatography due to this high specific surface area and uniform, fine porosity. MOFs have been used as stationary phases in high performance liquid chromatography, gas chromatography and capillary electrochromatography, either in pure form or incorporated into other materials. Various types of columns including MOFs have been prepared, such as packed, capillary and monolithic columns.

Packed columns are filled with fine particles as a stationary phase, and monolithic columns are filled with a continuous porous stationary phase. Capillary columns differ from packed and monolithic columns in that the stationary phase coats the inner surface of the column (i.e., inner surface of the capillary). There are two types of capillary columns: wall coated open tubular (WCOT) capillary columns, having a thin liquid film layered on the inner surface of the capillary walls and porous layer open tubular (PLOT) capillary columns, having a porous solid adsorbent layered on the inner surface of the capillary wall. To avoid bleeding of the stationary phase at high temperature and to increase the thermal stability of columns, the stationary phase is preferably chemically bonded to the inner surface of the capillary walls as opposed to being simply deposited on the walls. In wall coated open tubular capillary columns, the main interaction responsible for analyte retention is the solubility of the analyte in the liquid stationary phase, which is a viscous polymeric material, whereas in porous layer open tubular capillary columns, the main interaction responsible for analyte retention is selective adsorption of the analyte on the porous solid adsorbent layered on the inner surface of the capillary wall. In this case, the porosity of the sorbent increases the concentration of interaction sites and enhances separation, but can also induce peak broadening and tailing, which affect the column efficiency. In order to get sharper peaks and better resolution, the thickness of the stationary phase layer must be very small, generally less than 1 µm. The reduced material of this thin layer is compensated by using longer capillary columns to achieve an acceptable retention (more than 10 m).

MOF use as separation media in chromatography is presently limited, despite its potentially advantageous properties. Typically, MOFs have been either packed in stainless steel columns as fine particles or incorporated to a monolithic polymer to enhance the column efficiency in gas chromatography or high performance liquid chromatography.

Among the numerous metal-organic frameworks presently known, several materials based on group IV elements exhibit high stability and large specific surface area. This may be due to strong interaction between the transition metals of group IV and oxygen atoms of the organic ligand. In particular, a series of zirconium-based MOFs with aromatic dicarboxylic linkers have been shown to be insensitive to most solvents, with a thermal stability above 400° C.

Zr-based MOFs feature remarkable thermal, solvent and pressure stability, making them good candidates for application as stationary phase in chromatographic separation, albeit other MOFs with similar properties may also be considered. UiO-66 (Universitetet i Oslo), for example, is a metal organic framework made up of $[Zr_6O_4(OH)_4]$ clusters with 1,4-benzodicarboxylic acid (terephthalic acid) struts. UiO-66 MOF features zirconium as a tetravalent cation and terephthalic acid as a difunctional linker. In UiO-66 MOF structures, the transition metal atom Zr is 12 coordinated, which is the highest coordination reported for metal-organic frameworks. Previous works on UiO-66 have shown that UiO-66 MOF has two types of pores: tetrahedral and octahedral, with pore sizes of 8 Å and 11 Å, respectively. These pores allow insertion of small organic molecules such as substituted benzenic compounds.

Thus, a method of fabricating capillary columns including in-situ formation of a MOF porous layer solving the aforementioned problems is desired.

3. Summary

An embodiment of the present subject matter is directed to a method for preparing a capillary column including forming a stationary phase including a metal-organic framework (MOF). The method can include providing carboxyl groups to an inner surface of the capillary tube and forming the metal-organic framework (MOF) as the stationary phase directly on the inner surface modified by the carboxyl groups. The MOF can be formed on the inner surface by loading a solution comprising a solvent, a metal precursor and an organic linker in the capillary tube, then performing a polymerization reaction via heating of the capillary tube. The MOF can include a plurality of metal ion building units coordinating the organic linker. In an embodiment, the metal ion building units are zirconium and may be provided by using zirconium tetrachloride as the metal precursor. In another embodiment, the organic linker is benzene-1,4-dicarboxylic acid.

Another embodiment of the present subject matter includes a capillary column for gas chromatography, comprising an MOF stationary phase formed on an inner surface of the capillary column. The MOF may be formed on the inner surface according to the methods described herein. The stationary phase can be covalently bound to the inner surface. The MOF may be UiO-66.

In an embodiment, components of a liquid or gaseous mixture can be separated using the capillary column for gas chromatography described herein. If the mixture is liquid, the method can include vaporizing the mixture to produce a gaseous mixture; and applying the gaseous mixture through the capillary column. In an embodiment, the capillary column can be a PLOT column.

These and other features of the present subject matter will become readily apparent upon further review of the following specification.

4. BRIEF DESCRIPTION OF THE DRAWINGS

Similar reference characters denote corresponding features consistently throughout the attached drawings.

5. DETAILED DESCRIPTION OF THE PREFERRED EMBODIMENTS

Figure 1A:
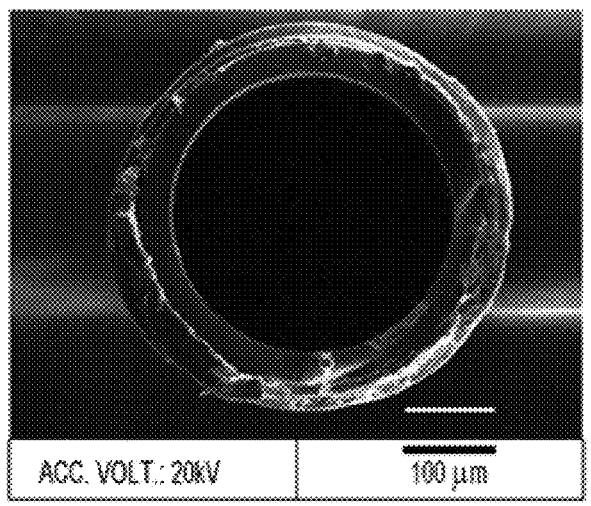
FIGS. 1A-1B show scanning electron microscopy (SEM) images of a fused silica capillary column having a porous layer of UiO-66 MOF, with (A) being a full cross-section and (B) being a high magnification cross-section.

An embodiment of the present subject matter is directed to a method for preparing a capillary column or tube for gas chromatography. The method can include in situ formation of a metal-organic framework (MOF) as the stationary phase in the capillary column. In an embodiment, the capillary column can be a porous layer open tubular (PLOT) capillary column. In an embodiment, the method can include providing carboxyl groups to an inner surface of the capillary tube and forming the metal-organic framework (MOF) as the stationary phase on the inner surface. The MOF can be formed on the inner surface by loading a solution comprising a solvent, a metal precursor, and an organic linker in the capillary tube. The capillary column with the solution loaded therein can be heated to cause a polymerization reaction in the column. The MOF can include a plurality of metal ion building units coordinating the organic linker. In an embodiment, the metal ion building units are zirconium and may be provided by using zirconium tetrachloride as the metal precursor. In an embodiment, the organic linker is benzene-1,4-dicarboxylic acid. The MOF can form a continuous coating layer on the inner surface with a uniform thickness ranging from about 0.1 μm to about 2.0 μm. In an embodiment, the inner surface includes fused silica. In an embodiment, the MOF is UiO-66.

The zirconium tetrachloride and the organic linker may be provided at a molar ratio of about 3:1-1:3, 2:1, 1:2, or 1:1. The solvent may comprise dimethyl formamide with acetic acid. In a particular embodiment, a volume:volume ratio of the dimethyl formamide and acetic acid can be about 3:1. The concentration of the zirconium tetrachloride in the solution may be about 1 mM to 20 mM or, in a particular embodiment, about 5 mM to 10 mM. In an embodiment, the benzene-1,4-dicarboxylic acid may also be at a concentration ranging from about 1 mM to 20 mM and, particularly, about 5 mM to 10 mM. The capillary tube may be, for example, a fused silica capillary tube.

In a particular embodiment, the step of providing carboxyl groups to the inner wall of the capillary tube can include silanizing the inner wall of the capillary tube, thereby providing amino groups on the inner surface, converting the amino groups to aldehyde groups, and oxidizing the aldehyde groups to create the carboxyl groups on the inner wall of the capillary tube. Silanizing may be achieved by loading a solution comprising 3-aminopropyltriethoxysilane into the column to form amino groups on the inner surface. The amino groups may be converted to aldehyde groups by loading a solution comprising glutaraldehyde into the column. The aldehyde groups can be oxidized to provide carboxyl groups by adding a solution comprising potassium permanganate to the column. Finally, the inner surface provided with carboxyl groups may be dried by a flow of inert gas and conditioned by heating under inert gas flow at a series of increasing temperatures.

Another embodiment of the present subject matter includes a capillary column comprising a stationary phase iEncluding an MOF ("an MOF stationary phase") on an inner surface of the capillary column. The stationary phase formed on the inner surface can be covalently bound to the inner surface. The MOF may be UiO-66. The MOF may form a continuous layer on the inner surface with a uniform thickness ranging from about 0.1 m to about 2.0 μm. In an embodiment, the inner surface includes fused silica.

An embodiment of the present subject matter includes a method of separating components of a liquid or gaseous mixture using the capillary column with the MOF stationary phase described herein. If the mixture is liquid, the method includes vaporizing the mixture to produce a gaseous mixture and applying the gaseous mixture through the capillary column.

In an experiment, the present capillary columns were prepared by treating an inner surface of a fused silica capillary column and then synthesizing a UiO-66 MOF layer directly on the treated inner surface. The exemplary fabricated capillary columns were characterized and then connected to a gas chromatography oven to evaluate separation performance by injection of a series of solutes.

Although fused silica columns are described as exemplary capillary columns for gas chromatography, columns formed from other materials, such as glass or stainless steel, can also be used in the methods described herein. For such materials, the surface activation chemistry may have to be adapted accordingly. For chemical attachment of the MOF to a capillary surface according to the present subject matter, any suitable difunctional spacer providing a free terminal carboxylic group may be used. In the exemplary implementation, the fused silica inner surface was ultimately covered with carboxylic groups from oxidation of aldehyde groups. Any other covalent bonding scheme may be used.

Although UiO-66 is used herein as an exemplary MOF, it is contemplated that another MOF may be grown in situ according to the present method by selecting an appropriate metal precursor and organic linker, at a desired molar ratio and concentration in solvent and applying an appropriate temperature, as may be learned from existing methods. See, for example, Shearer, G. C., et al. (2014). Tuned to perfection: ironing out the defects in metal-organic framework UiO-66. *Chemistry of Materials,* 26(14), 4068-4071. In the following examples, the molar ratio of metal precursor to organic linker used was 1:1, but the molar ratio can be 1:3-3:1, or 1:2-2:1, for example. Similarly, in the following examples, the MOF layer is grown at a temperature of 120° C., but embodiments of the present method include growth temperatures ranging from about 100° C. to about 300° C., about 100° C. to about 200° C., and about 100° C. to about 150° C.

The amounts of materials for the methods described herein are exemplary, and appropriate scaling of the amounts are encompassed by the present subject matter, as long as the relative ratios of materials are maintained. As used herein, the term "about," when used to modify a numerical value, means within ten percent of that numerical value. The following examples illustrate the present teachings.

EXAMPLES

Example 1

Exemplary Implementation of Present Method

Several capillary columns were prepared using fused silica tubing having different lengths (from 2 m to 30 m.) and inner diameters (from 75 μm to 320 μm). The first step of the preparation included chemical modification of the fused silica inner surface. Each bare capillary was first washed with acetone, then rinsed with 1.0 M sodium hydroxide for at least 4 hrs., thoroughly washed with ultrapure water to pH 7, rinsed with 0.1 M hydrochloric acid for at least 30 min., and washed again with ultrapure water to pH 7. The capillaries were then dried by heating to 100° C. in a gas chromatography (GC) oven under helium gas flow as an inert gas for 4 hrs.

The activated inner surface of the fused silica was silanized by filling the capillary with a solution of 3-aminopropyltriethoxysilane (APTES) in ultrapure water (10%, v/v) followed by heating at 95° C. for 30 min. In order to obtain a high derivatization of free silanol groups, this silanization treatment was repeated four times. The capillary was then rinsed with ultrapure water to remove any remaining reactant. The amino-terminated groups were converted to aldehydes by filling the capillary with a glutaraldehyde solution (2%, v/v, pH 8) and heated at 40° C. for 1 hr. After rinsing the column with ultrapure water, the terminal groups of the organic layer were oxidized by flushing with a 0.1 M potassium permanganate solution for 1 hr. at 40° C. The treated capillary with an inner surface decorated with carboxyl-terminated groups was then washed with ultrapure water for 3 hrs., and then ethanol for 1 hr. Finally, the column was dried by heating at a temperature increased from 40 to 100° C. and maintained at 100° C. until dry (i.e., overnight). All solutions were injected into the capillary column using a syringe pump at a constant flow rate of 0.3 mL/hr.

The metal-organic framework was synthesized in-situ inside the carboxyl-terminated capillary as a thin layer chemically attached to the carboxyl-terminated modified silica surface. This highly stationary phase was prepared by a one-pot reaction which proved to be more convenient than other procedures which include successive layer-by-layer reactions. An equimolar mixture of zirconium tetrachloride and benzene-1,4-dicarboxylic acid (1:1) dissolved in in a mixture of dimethyl formamide (DMF) with acetic acid (3:1, v/v) at various concentrations of reactants in the solvent was filled in the modified capillary which was then sealed at both ends. The molar amounts of the reactants added to each column was varied to synthesize final MOF layers with different thicknesses. The sealed columns were heated at 120° C. for 24 hrs., resulting in a MOF stationary phase attached to the inner surface of the capillary. After preparation of the MOF stationary phase, the column was thoroughly washed with ethanol for several hours then connected to a GC oven for drying and conditioning. For this purpose, the temperature program corresponded to a progressive heating as follows: 40° C. for 10 min., ramp 1°/min. to 120° C., isothermal at 120° C. for 120 min., ramp 1°/min. to 200° C., isothermal at 200° C. for 240 min. This conditioning procedure aims to clean the prepared MOF coating from any solvent or remaining volatile compounds, making the prepared column suitable for chromatographic analysis, for example.

Example 2

Demonstration of the as-Prepared Capillary Columns in Gas Chromatography Separation The exemplary MOF layer formed on the inner surface of the fused-silica capillary columns was characterized by scanning electron microscopy with energy dispersive spectroscopy (SEM-EDS). (e.g., FIGS. 1A-1B). Several columns with different sizes and MOF contents were prepared and examined. All obtained micrographs showed that each inner surface of the capillaries was uniformly coated with a thin layer of UiO-66 porous material. No voids were observed between the coating and the capillary surface. The thickness of this MOF coating was in the range 0.1 to 2.0 μm, depending on the concentration of metal and organic linker in the reaction mixture. In particular, concentrations of reactants, zirconium tetrachloride and benzene-1,4-dicarboxylic acid, in solvent used were 10 mM, 5 mM, 3 mM and 1.5 mM. The two smallest concentrations did not provide a MOF layer with measurable thicknesses. For the two higher concentrations, the obtained MOF layer thicknesses were: 0.5 m for 10 mM and 0.3 μm for 5 mM. These results confirmed that the stationary phase thickness increased with the concentration of both metal and organic linker. Subsequent application experiments showed that the prepared columns with a MOF thickness of around 0.5 m provided the best chromatographic efficiency. This value is close to the stationary phase thickness of most commercial capillary columns, which is in the range 0.25 to 0.5 m.

SEM micrographs confirmed that the prepared MOF coating was continuous on the inner capillary surface with uniform thickness. The chemical composition of the MOF layer was investigated by energy dispersive spectroscopy; characteristic peaks observed in the EDS spectrum corresponded to the main elements present in the UiO-66 material: carbon, oxygen and zirconium. The present method allows for formation of a stationary phase that is entirely MOF with no need for additional binding agents, additives of scaffolds of any sort. The specific surface area of the UiO-66 prepared was found to be about 1200 $m^2/g$.

Figure 1B:
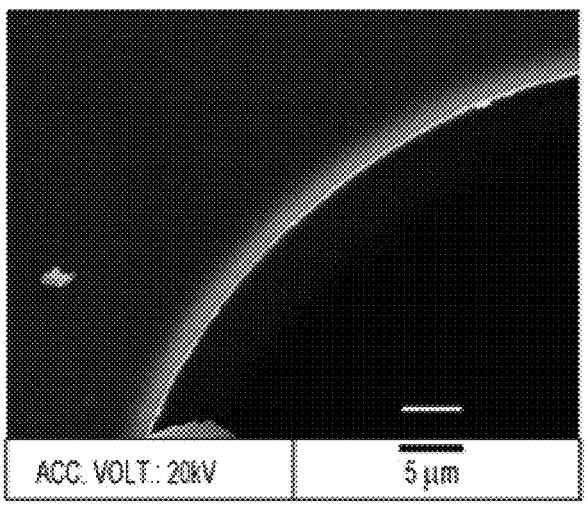

FIG. 1A shows an SEM micrograph of the cross section of a capillary column with inner diameter of 320 µm. FIG. 1B shows an enlarged portion of the capillary where the thickness of the MOF layer was about 1 µm.

The separation ability of the as-prepared capillary columns was demonstrated by gas chromatography performed using the as-prepared capillary columns for analysis of various organic solutes. FIGS. 2-6 show results of these separation experiments using the as-prepared columns, as indicated. These experiments were performed under constant flow of helium and under a programmed temperature control ranging from 50° C. to 180° C., unless indicated otherwise.

In gas chromatography, solute retention is mainly governed by the volatility of each solute, which depends largely on its boiling point. Therefore, compounds having the same chemical groups are eluted by order of increasing molecular weight. However, MOFs materials are highly porous crystalline solids and show a retention behavior different from polymeric liquid stationary phases in that the retention depends also on molecular shape and size. In a series of isomeric compounds, the more branched homologues may be eluted after the linear isomer, even though the latter is less volatile. This unusual elution order is called reverse shape selectivity. It can be explained by the easier inclusion and higher interaction of more branched isomers in MOF cavities relative to a linear homologue. This behavior was observed for many homologous series separated on the prepared UiO-66 capillary columns. As an example, the following table shows the separation of a mixture of light hydrocarbons obtained on a 40 m long column, with inner diameter 100 m. It can be seen that, contrary to what would be expected with conventional stationary phases, 1-butene is eluted before 1-propene-2-methyl and n-butane has lower retention than iso-butane.

TABLE 1

Separation of light hydrocarbons on prepared capillary column

| Peak no. | Compound | Retention time (min) | Boiling point (° C.) |
|---|---|---|---|
| 1 | Ethane | 6.76 | −89 |
| 2 | Propene | 6.97 | −47.6 |
| 3 | Propane | 7.1 | −42 |
| 4 | 1-butene | 7.77 | −6.3 |
| 5 | 1-propene-2-methyl | 8.19 | −6.9 |
| 6 | 2-butene | 8.44 | 3.7 |
| 7 | n-butane | 8.8 | −1 |
| 8 | iso-butane | 9.35 | −11.7 |

Figure 2:
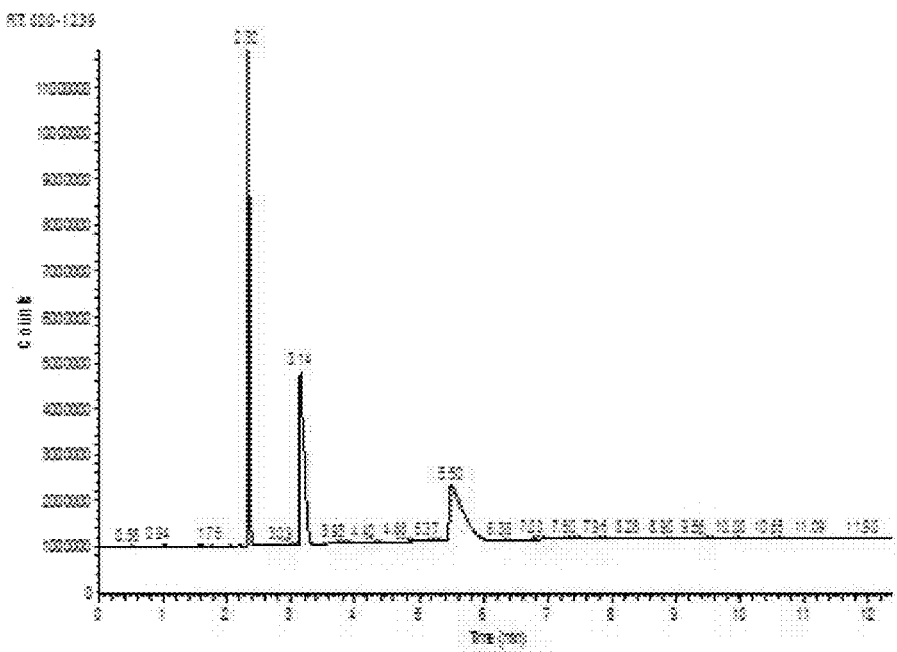
FIG. 2 depicts results of separation of alkanes n-$C_{10}$, n-$C_{11}$ and n-$C_{12}$ on an exemplary UiO-66 coated capillary column (2.5 m, 0.32 mm) using a programmed temperature and constant flow of helium.
Figure 3:
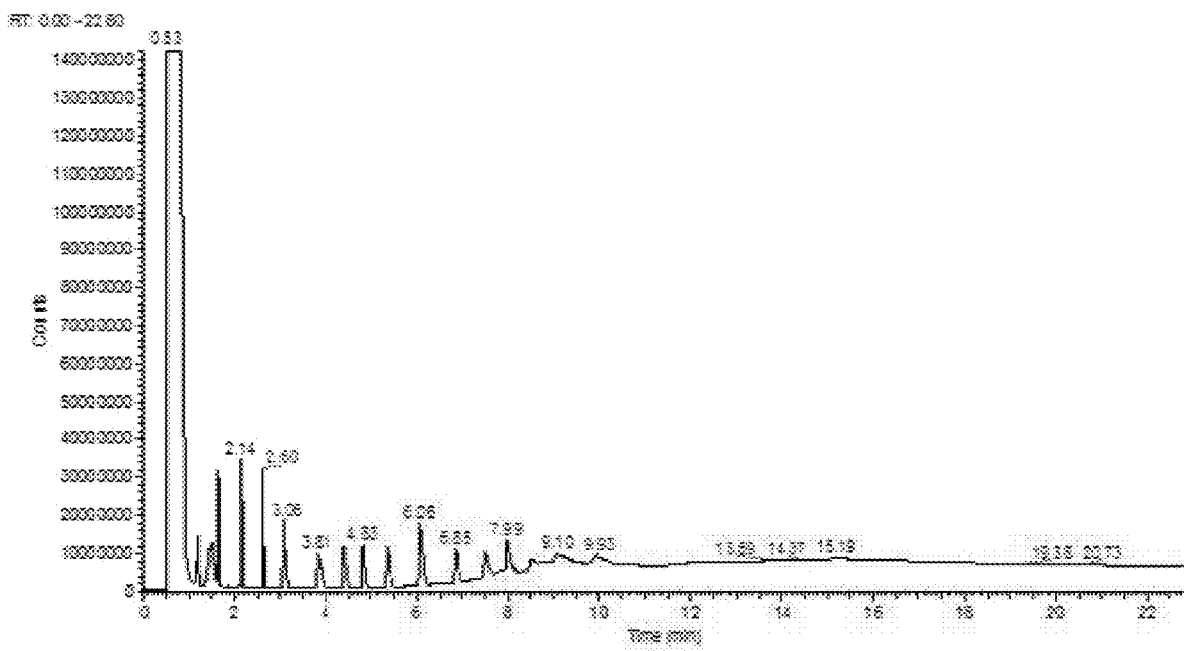
FIG. 3 depicts results of separation of alkanes n-$C_8$-n-$C_{20}$ on UiO-66 coated capillary column (2.5 m, 0.32 mm) using a programmed temperature and constant flow of helium.

FIG. 2 shows results of separation of three linear alkanes, decane, undecane and dodecane, using an exemplary capillary column (2.5 m in length, 0.32 inner diameter). FIG. 3 shows the results of separation of another series of alkanes from octane to eicosane on the same column using programmed temperature.

Figure 4:
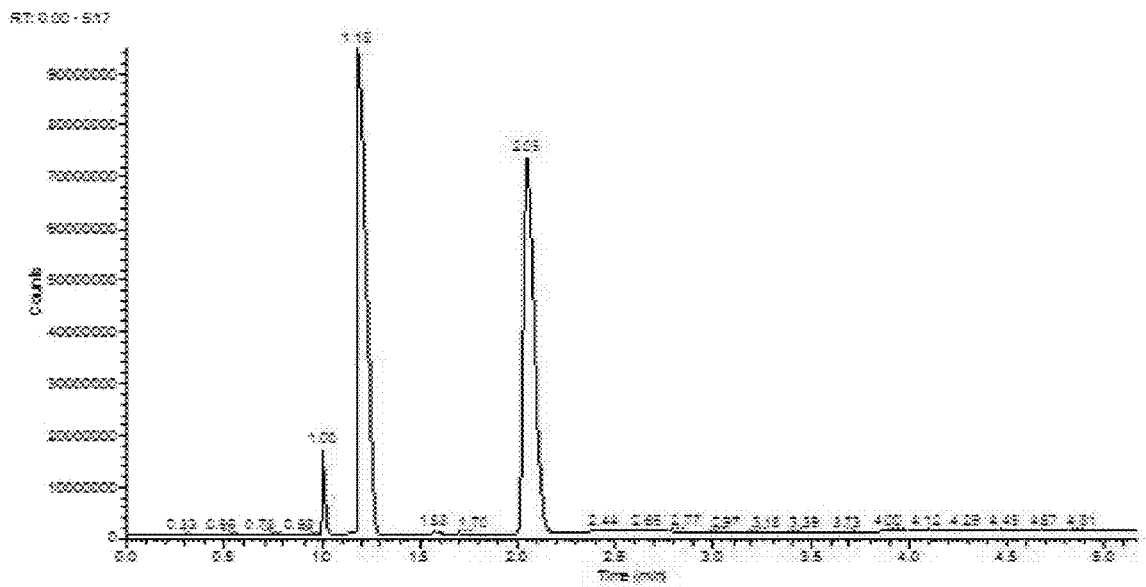
FIG. 4 depicts results of separation of n-octane and iso-octane (2,2,4-trimethylpentane) on UiO-66 coated capillary column (2.5 m, 0.32 mm) using a programmed temperature and constant flow of helium.

The shape, size and conformation selective adsorption is also shown in FIG. 4, which demonstrates remarkable separation between two structural isomers: n-octane and iso-octane (2,2,4-trimethylpentane). Moreover, iso-octane is much more retained than n-octane, although it is more substituted and less volatile than linear Cis. This reversed elution order is consistent with easier inclusion of the more branched isomer in the pores of the MOF layer of the exemplary capillary columns.

Figure 5:
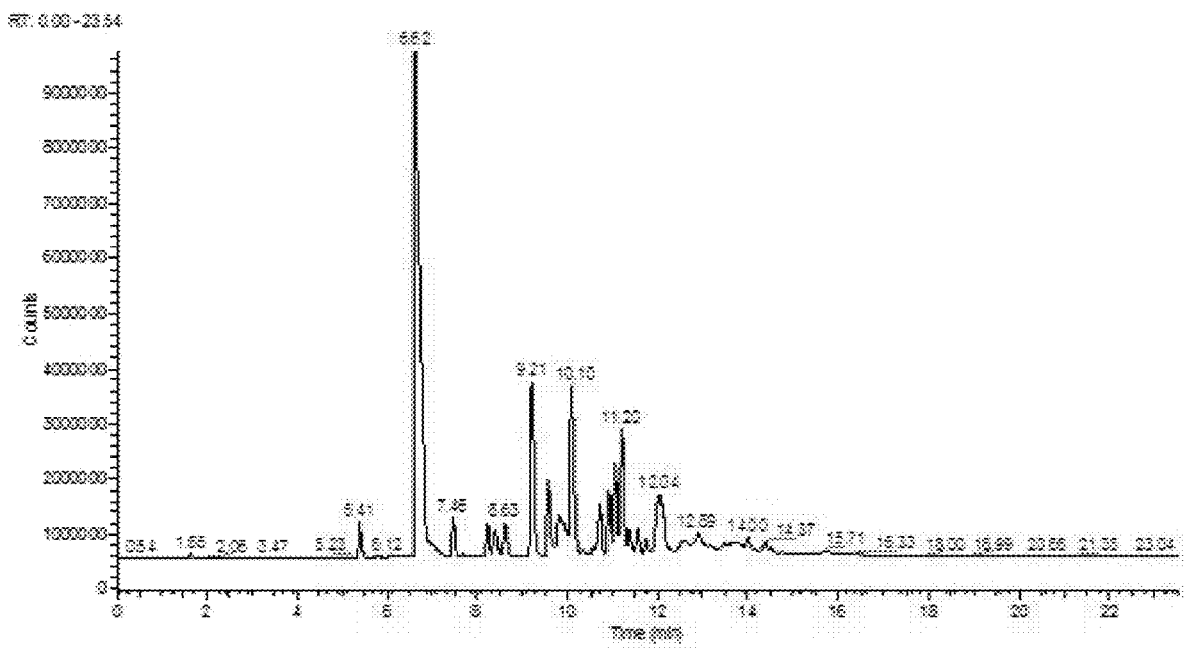
FIG. 5 depicts a chromatogram of gasoline fuel on UiO-66 coated capillary column (2.5 m, 0.32 mm) in an oven with a temperature programmed from 50° C. to 180° C. and constant flow of helium.

FIG. 5 shows the chromatogram of gasoline achieved using one of the prepared capillary columns coated (2.5 m long, 0.32 mm inner diameter). The main constituents of gasoline are well-resolved in the selected conditions.

Figure 6:
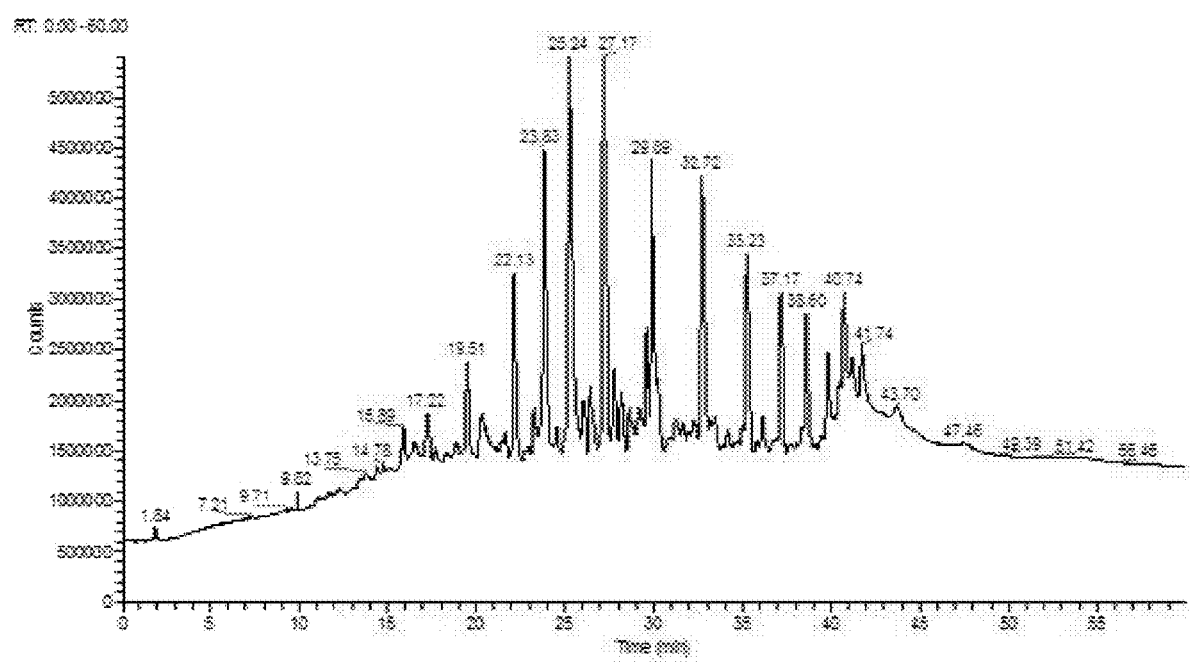
FIG. 6 depicts a chromatogram of diesel fuel on UiO-66 coated capillary column (2.5 m, 0.32 mm) using oven temperature programmed from 80° C. to 280° C. and constant flow of helium.

FIG. 6 shows separation of the main components of diesel fuel achieved on the prepared capillary column using an oven temperature programmed from 80° C. to 280° C.

The present method and resulting capillary columns provide numerous advantages over existing technologies. The method for preparation of capillary columns with an inner surface having a thin layer of metal-organic framework as a stationary phase allows for in-situ growth of the MOF in a typical fused silica capillary by a one-pot self-assembly epitaxial growth reaction between the metal salt and the organic linker. To obtain a uniform and stable coating of the MOF film, the inner silica surface is first treated by activation of the superficial groups followed by their derivatization to allow their reaction with the metal and organic ligand of the MOF. The prepared capillary columns showed inner silica walls totally covered with a uniform layer of MOF material with the same thickness. The amount of synthesized MOF stationary phase and the thickness of its coating can be controlled by adjusting the concentrations of both transition metal and organic linker in the reaction mixture. The thickness of the fabricated columns was in the range between 0.1 and 2.0 µm, which corresponds to that of most existing commercial capillary columns.

The prepared capillary columns were used in gas chromatography under various experimental conditions. No bleeding of any component or fragment of the stationary phase was observed; proving that the prepared MOF stationary phase is firmly attached to the fused silica surface.

A wide variety of solvents and organic probes were injected in the prepared capillary columns, using different chromatographic parameters: column temperature, carrier gas flow rate, injection mode, sample volume. The obtained results were highly reproducible, showing a remarkable mechanical and chemical stability of the MOF thin layer. In applying the prepared columns to separate different organic solutes at increasing oven temperatures, the same retention and separation parameters were recorded after repeated analyses. The results proved that the column performance was not affected even after heating above 400° C., which indicates a notably high thermal stability.

In addition to thermal stability, the chromatographic performance of the prepared capillary provided high separation efficiency for the investigated samples, likely due to the uniform thickness and pores size of the as-synthesized MOF layer. The present method of MOF stationary synthesis allows preparation of tailored columns with any desired length and diameter, as well as a selected retention and efficiency by controlling the amount (thickness) of the stationary phase. These properties allow the use of relatively short capillary columns for fast baseline separation of various solutes, even highly volatile solutes. The thermal stability of the MOF materials make as-prepared capillary columns suitable for separation and investigation of less volatile and high-molecular weight solutes in complex natural and synthetic samples. Due to their unique porous structure, MOF based capillary columns allow the separation of structural isomers with unrivaled resolution, making them suitable for analysis of mixtures of isomers and stereoisomers.

It is to be understood that the present methods and capillary columns are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for preparing a capillary column for gas chromatography, comprising:
   providing the capillary column having a fused silica inner surface;
   chemically modifying the fused silica inner surface of the capillary column to provide a modified fused silica inner surface; and
   forming a metal-organic framework (MOF) on the modified fused silica inner surface in a one-step reaction.

2. The method of claim 1, wherein the metal-organic framework is formed on the modified fused silica inner surface by loading a solution comprising a metal precursor and an organic linker in the capillary column and heating the capillary column loaded with the solution.

3. The method of claim 2, wherein the metal precursor is zirconium tetrachloride.

4. The method of claim 2, wherein the organic linker is benzene-1,4-dicarboxylic acid.

5. The method of claim 2, wherein the metal precursor is zirconium tetrachloride and the organic linker is benzene-1,4-dicarboxylic acid, the zirconium tetrachloride and the benzene-1,4-dicarboxylic acid being present in the solution in a molar ratio ranging from about 2:1 to about 1:2.

6. The method of claim 5, wherein a concentration of the zirconium tetrachloride ranges from about 1 mM to about 20 mM and a concentration of the benzene-1,4-dicarboxylic acid ranges from about 5 mM to about 10 mM.

7. The method of claim 6, wherein the solution further comprises dimethyl formamide and acetic acid.

8. The method of claim 7, wherein a volume:volume ratio of the dimethyl formamide and the acetic acid is about 3:1.

9. The method of claim 1, wherein the step of chemically modifying the fused silica inner surface of the capillary column comprises:
   silanizing an inner wall of the capillary column to provide amino groups on the fused silica inner surface;
   converting the amino groups to aldehyde groups; and
   oxidizing the aldehyde groups to provide carboxyl groups on the fused silica inner surface of the capillary column.

10. The method of claim 9, wherein the step of silanizing the inner wall comprises adding a solution comprising 3-aminopropyltriethoxysilane to the capillary column; and the step of converting the amino groups to aldehyde groups comprises adding a solution comprising glutaraldehyde to the capillary column.

11. The method of claim 10, wherein the step of oxidizing the aldehyde groups to provide carboxyl groups on the fused silica inner surface of the capillary column comprises flushing the capillary column with a solution comprising potassium permanganate.

12. A capillary column, comprising:
   the capillary column comprising a fused silica inner surface;
   a stationary phase comprising a uniform layer of a metal-organic framework covalently bound to the fused silica inner surface of the capillary column; and
   wherein the capillary column is configured to separate components of a liquid or gaseous mixture using gas chromatography.

13. The capillary column of claim 12, wherein the metal-organic framework comprises UiO-66.

14. The capillary column of claim 13, wherein the layer of the metal-organic framework has a thickness ranging from about 0.1 μm to about 2.0 μm.

* * * * *